May 22, 1962     L. S. JAWORSKI     3,035,624
SPRING CAGE NUT WITH DEFORMABLE HOOKS
Filed Jan. 26, 1959     2 Sheets-Sheet 1
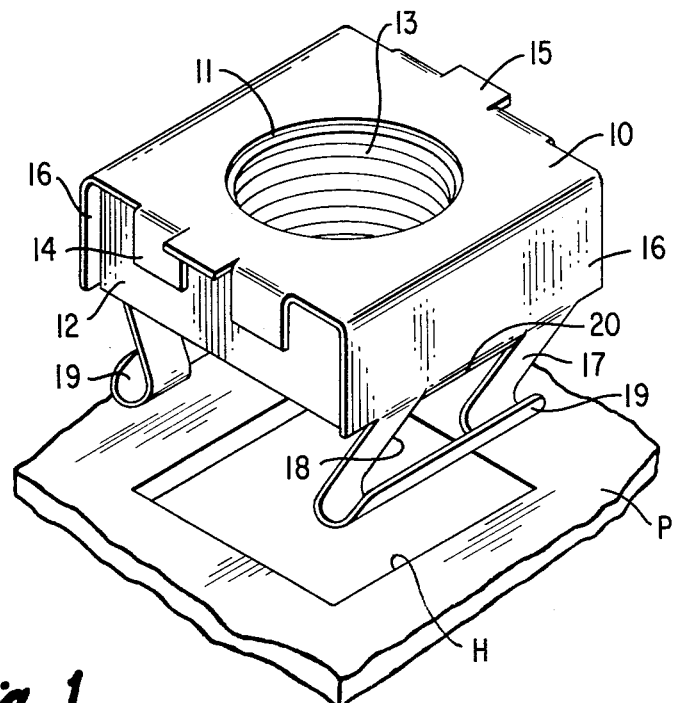
Fig. 1
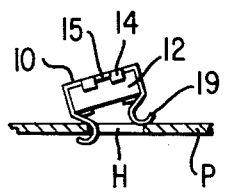 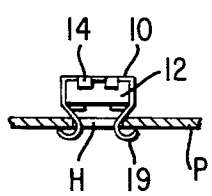 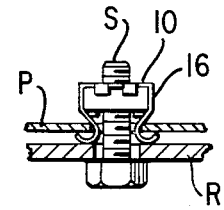 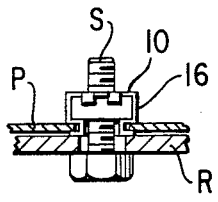
Fig. 3     Fig. 4     Fig. 5     Fig. 6
INVENTOR.
LEONARD S. JAWORSKI
BY
ATTORNEY May 22, 1962 L. S. JAWORSKI 3,035,624
SPRING CAGE NUT WITH DEFORMABLE HOOKS
Filed Jan. 26, 1959 2 Sheets-Sheet 2

INVENTOR.
LEONARD S. JAWORSKI
BY
ATTORNEY

United States Patent Office 3,035,624
Patented May 22, 1962

3,035,624
SPRING CAGE NUT WITH DEFORMABLE HOOKS
Leonard S. Jaworski, Toledo, Ohio, assignor to Prestole Corporation, Toledo, Ohio, a corporation of Michigan
Filed Jan. 26, 1959, Ser. No. 788,910
1 Claim. (Cl. 151—41.75)

This invention relates to cage nuts but particularly to a sheet metal holder for retaining a nut in place and which is adapted to be mounted on a supporting panel preparatory to receiving a screw.

An object is to produce a cage nut of the above character which can be manufactured economically on a quantity production basis; can retain a nut in position of use; and can be readily applied to a panel aperture for reliable retention.

Other objects and advantages of the invention will hereinafter appear and for purposes of illustration but not of limitation and embodiment of the invention is shown on the accompanying drawings in which FIGURE 1 is a top perspective view of the cage nut preparatory to application to an apertured panel, the latter being shown in fragment;

FIGURE 3 is a side view of the cage nut being applied to the aperture of a supporting panel;

FIGURE 4 is a view similar to FIGURE 3 showing the nut mounted in the panel aperture in position of use;

FIGURE 5 is a side elevation of the cage nut mounted in a panel and showing another panel being applied thereto, a screw extending through an aperture in the second panel and threadedly engaging the cage nut; and FIGURE 6 is a view similar to FIGURE 5 but showing the position of the parts after the screw has been tightened and the nut drawn toward the adjacent surface of the panel.

Figure 2:
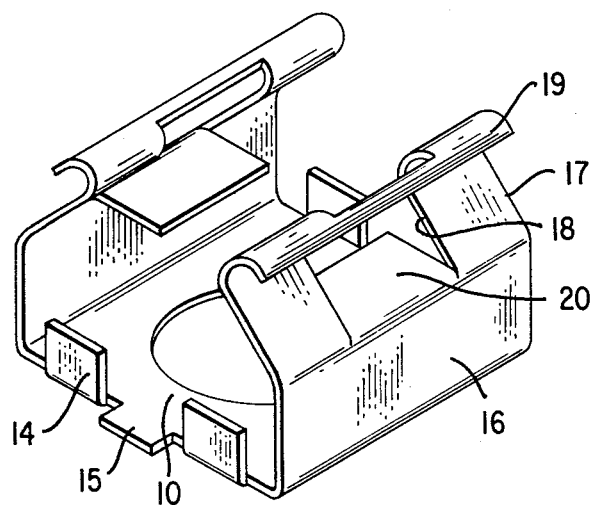
FIGURE 2 is a bottom perspective view of the cage without the nut.

The illustrated embodiment of the invention comprises a one-piece cage nut of spring sheet metal having a flat base plate or panel 10 formed with a central hole 11. In this instance the base plate 10 is rectangular in shape to fit a correspondingly shaped metal nut 12 and abut flatly against an end face thereof, the nut being formed with a central screw threaded hole while registers with the hole 11 in the base plate 10. At opposite sides of the base plate are integral tabs 14 which are turned down and bear against the adjacent sides of the nut 12. These tabs are arranged in pairs and the tabs of each pair being spaced laterally from each other and in such space is an outwardly extending tab 15 disposed in the plane of the base plate 10 and providing finger holds which enable the cage nut to be conveniently handled when applied to a supporting panel.

At each end of the base plate 10 is an integral downwardly bent panel 16 abutting the adjacent ends of the rectangular nut 12. These panels terminate substantially at the lower edge of the nut body. Integral with the lower edge of each of the end panels 16 is an inwardly and downwardly inclined terminal flap 17 which is of slightly less width than that of the adjacent end panel 16. Each terminal flap 17 has a cutout 18 which forms each terminal panel into a pair of laterally spaced spring fingers which terminate in an outwardly and upwardly curved hook 19. Each hook 19 connects the respective spring fingers and provides panel attaching portions.

Intermediate the spring fingers and integral with the lower edge of each end panel 16 is a tab 20 which is folded underneath the nut body 12 to retain it in place.

As shown in FIGURE 3 one of the hooks 19 engages through a hole H in a supporting panel P to abut against an edge thereof, the hole H being rectangular in form. After one of the hooks has been engaged in the manner shown in FIGURE 3 then the cage nut is forced downwardly, camming the opposite hook inwardly, the spring fingers yielding to accommodate this movement. After the hook has passed through the aperture H it snaps to the position shown in FIGURE 4, thereby holding the cage nut in position of use. FIGURE 5 shows another panel R being applied to the panel P. The panel R has a hole through which a screw S extends to engage the threads in the nut body 12. By tightening the screw the cage nut is forced downwardly causing the hooks and spring fingers to assume the flattened shape shown in FIGURE 6, whereby the cage nut is securely retained in place and the nut body is disposed in the desired position of use.

It will be understood that numerous changes in details of construction, arrangements and choice of materials may be effected without departing from the spirit of the invention especially as defined in the appended claim.

What I claim is:

A cage nut comprising a spring sheet metal holder having an apertured base plate, a nut body abutting the base plate and having a screw threaded bore registering with the aperture in the base plate, tab means on opposite sides of the plate bearing against the adjacent sides of the nut, said tab means comprising a pair of laterally spaced tabs, a third tab disposed between each pair of tabs and extending outwardly from the nut to afford finger holds for handling the cage nut, end panels integral with opposite ends of the base plate and disposed at approximately right angles thereto to engage the adjacent sides of the nut and terminating at the opposite edge of the nut body, a pair of integral laterally spaced relatively narrow fingers inclining downwardly and inwardly from each end panel and projecting substantially beyond the adjacent end of the nut body, a tab integral with each end panel and engaging the underside of the nut body and arranged between a pair of fingers, and hooks on the free ends of said fingers and integrally joining same and curved outwardly and upwardly from same with the free ends thereof approximately in the plane of the respective end panels for engagement in a supporting panel aperture, the curved portion of said hooks providing a cam surface to coact with an associated edge of the supporting panel aperture to resiliently urge said hooks and their respective pairs of fingers into the supporting panel aperture, the tip of said hooks being sufficiently spaced from their respective fingers to enable subsequent flattening thereof between one surface of a supporting panel and a supported panel while simultaneously flattening the portions of said fingers adjacent said end panels against the other surface of the supporting panel when said nut and the supporting and supported panels are forced together by screw action.

References Cited in the file of this patent
UNITED STATES PATENTS

| | | |
|---|---|---|
| 1,800,176 | Carr | Apr. 17, 1931 |
| 1,805,460 | Carr | May 12, 1931 |
| 2,391,046 | Tinnerman | Dec. 18, 1945 |
| 2,596,332 | Flora | May 13, 1952 |
| 2,695,046 | Tinnerman | Nov. 23, 1954 |